No. 737,003. PATENTED AUG. 25, 1903.
R. McKNIGHT.
APPARATUS FOR CONDENSING FUMES FORMED IN VOLATILIZATION PROCESSES.
APPLICATION FILED JAN. 5, 1903.
NO MODEL. 2 SHEETS—SHEET 1.

WITNESSES:
F. J. Hartman.
Walter C. Pusey.

INVENTOR:
Robert McKnight,
BY Joshua Pusey.
ATTORNEY.

No. 737,003. PATENTED AUG. 25, 1903.
R. McKNIGHT.
APPARATUS FOR CONDENSING FUMES FORMED IN VOLATILIZATION PROCESSES.
APPLICATION FILED JAN. 5, 1903.

NO MODEL. 2 SHEETS—SHEET 2.

WITNESSES:
F. J. Hartman
Walter C. Pusey

INVENTOR:
Robert McKnight
BY
Joshua Pusey
ATTORNEY.

No. 737,003.

Patented August 25, 1903.

UNITED STATES PATENT OFFICE.

ROBERT McKNIGHT, OF PHILADELPHIA, PENNSYLVANIA.

APPARATUS FOR CONDENSING FUMES FORMED IN VOLATILIZATION PROCESSES.

SPECIFICATION forming part of Letters Patent No. 737,003, dated August 25, 1903.

Application filed January 5, 1903. Serial No. 137,796. (No model.)

*To all whom it may concern:*

Be it known that I, ROBERT MCKNIGHT, a citizen of the United States, residing in the city and county of Philadelphia, in the State of Pennsylvania, have invented certain new and useful Improvements in Apparatus for Condensing Fumes Formed in Volatilization Processes, of which the following is a full, clear, and exact description, reference being had to the accompanying drawings, of which—

Figure 1:
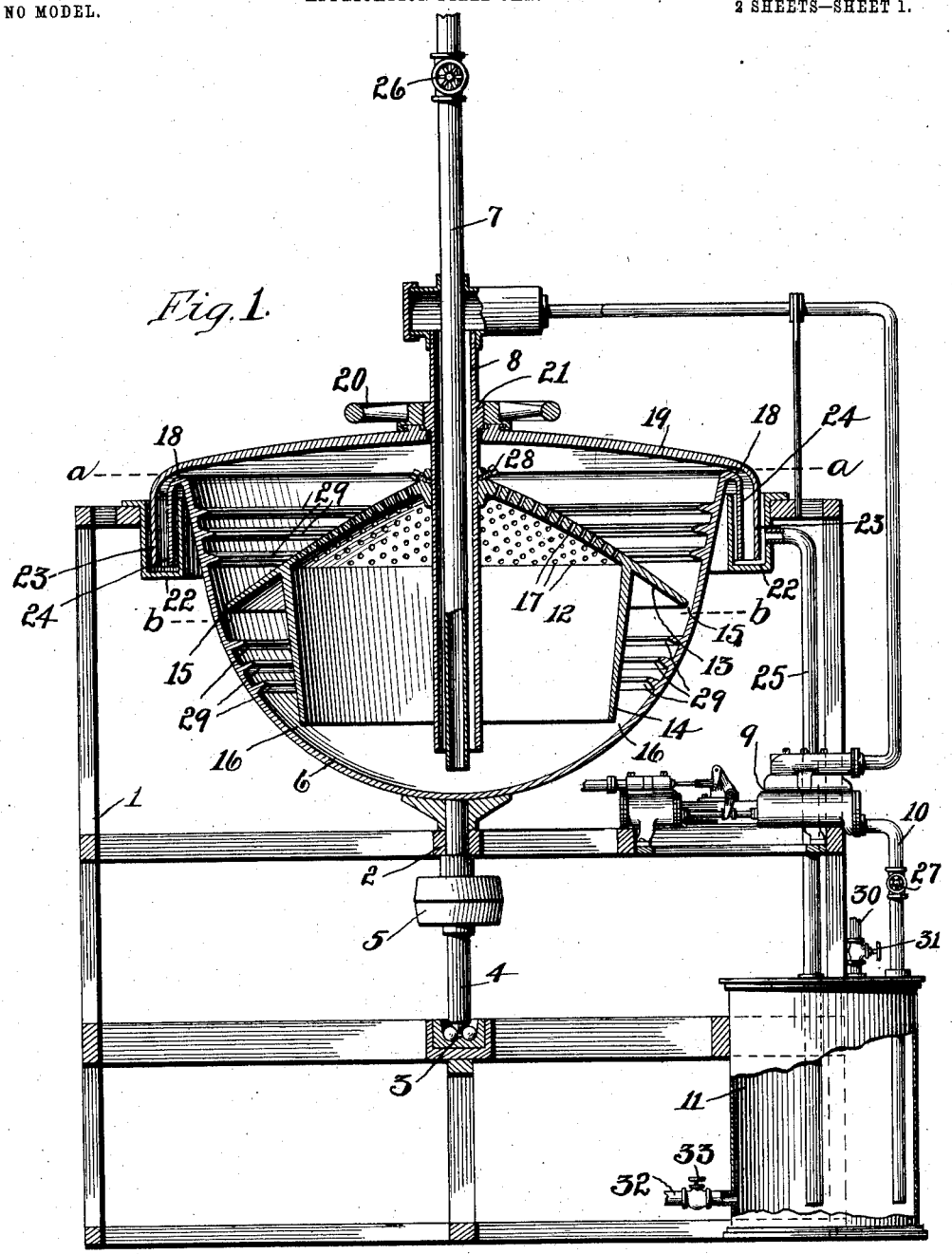
Figure 2:
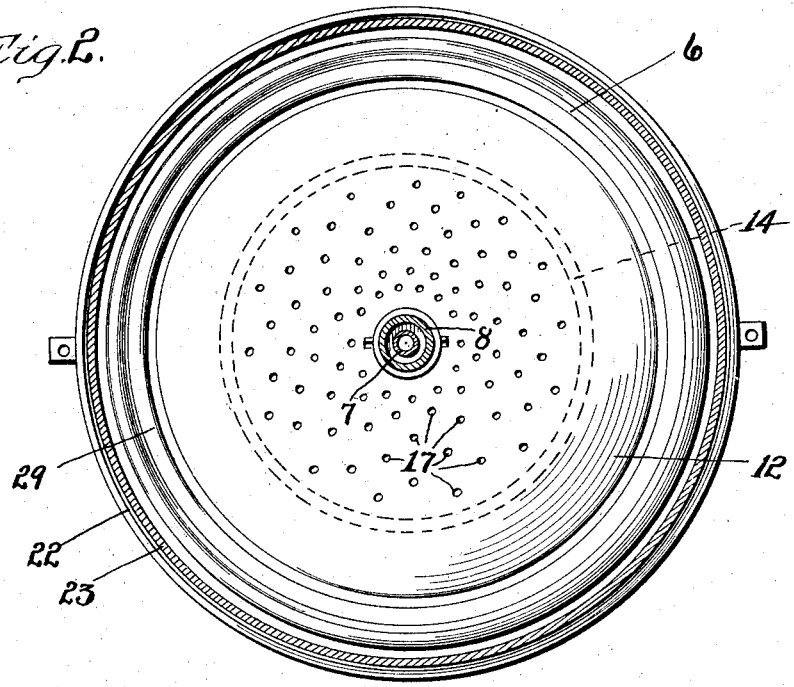
Figure 3:
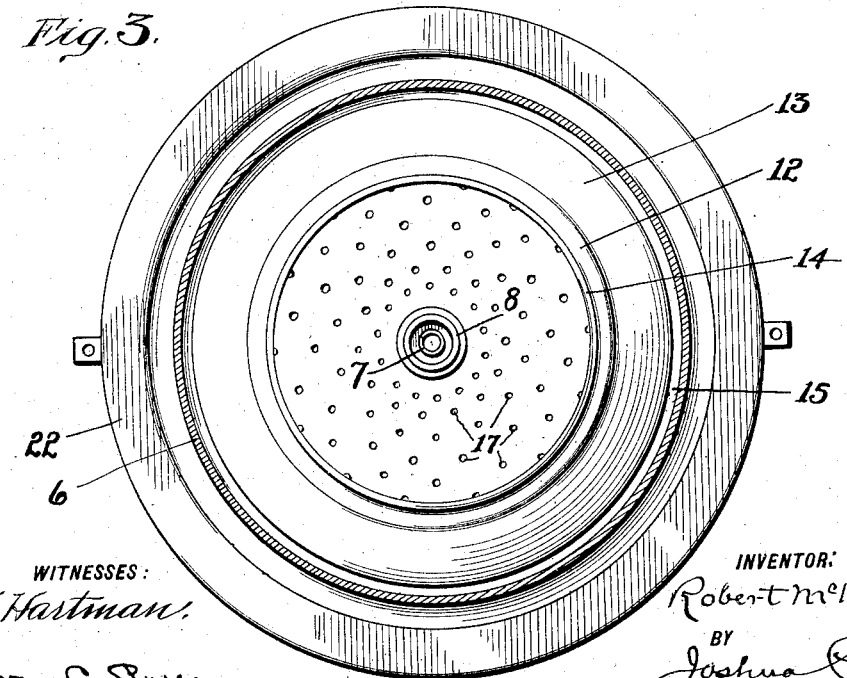

Figure 1 is a medial vertical section. Fig. 2 is a full section, as on line $a\ a$, Fig. 1. Fig. 3 is a similar section, as on line $b\ b$, Fig. 1, looking upwardly.

The object of this invention is to provide an improved means and apparatus for drawing over and "condensing" the fumes resulting from the treatment of ores containing metals in apparatus used in volatilization processes—as, for example, the process described in United States Letters Patent No. 685,691, granted to me October 29, 1901.

The invention is mainly based upon the fact that if a quantity of liquid—such as water, for example—be allowed to flow into the central portion of a suitable vessel closed against the admission of air and having an opening at the side thereof and a rapid rotary movement is imparted to the liquid within the bowl it (the liquid) will by centrifugal force be caused to fly from the central portion to the side of the bowl and escape from said opening, and there is a tendency to form a vacuum in the central part of the vessel.

The invention, broadly considered, comprises, in combination, a bowl practically closed against the admission of air having a lateral exit-opening, a pipe leading from a source of supply of water or other suitable liquid or solution into the bowl, a pipe leading from the volatilization apparatus into the central part of said bowl, a trough or receptacle exterior to the latter with which said exit-opening communicates, means for imparting to the liquid within the bowl a centrifugal motion, whereby it (the liquid) is caused to fly out from the center toward the circumference of said bowl and to escape from said opening into said receptacle or trough and the fumes are drawn by suction into the bowl through said pipe from the volatilization apparatus and are condensed or absorbed by the liquid and are carried off with the latter into said trough.

The invention also comprises, in combination with the foregoing-recited parts or features, means for effecting agitation or breaking up of the body of liquid within the bowl, whereby the fumes are brought into more intimate contact with the liquid.

The invention further relates to certain novel devices and combinations of mechanism hereinafter described and particularly pointed out.

Referring to the accompanying drawings, 1 denotes the frame of the apparatus. Journaled in suitable bearings 2 3 of this frame is a vertical rotatable shaft 4, adapted to be driven from a source of power by a belt (not shown) passing around a pulley 5 on said shaft. Fixed to the upper end of the shaft is a vessel 6, hereinafter termed the "bowl," that flares outwardly at the top. Substantially concentric with this bowl and extending adjacent to the bottom thereof is a vertical pipe 7, hereinafter termed the "fume-pipe," that leads from a volatilization apparatus, such as hereinbefore referred to.

8 is a pipe, hereinafter termed the "water-pipe," leading from a source of supply of water or other suitable liquid into the bowl 6. In the present instance this pipe communicates with a pump 9, into which leads a pipe 10, that communicates with a tank 11 for containing water or other liquid. Preferably the fume-pipe passes through and is concentric with the water-pipe 8, as shown. Secured to the latter pipe within the bowl is a structure 12, consisting of an inverted dished plate 13, having projecting from its under side an annulus or skirt 14 of smaller diameter than that of said plate. The respective diameters of said skirt and plate with relation to the inner side of the bowl are such, as shown, that narrow passage-ways 15 and 16 are formed between the bowl and the plate and skirt, respectively. The portion of the plate between the junction of the skirt therewith and the hub of the plate is provided with numerous perforations 17.

Extending over the bowl, but out of contact therewith, so as to leave a space or passage-way 18, is a cover 19, through an opening in which the water-pipe 8 passes and to which latter the cover is secured. The cover may be adjusted vertically on the pipe by means of a hand-wheel 20, that is connected to the cover, and its hub is provided with screw-threads engaging corresponding threads of the said pipe 8 or in the present instance of a boss 21 thereon, as clearly seen in Fig. 1.

Encircling the upper portion of the bowl is an annular receptacle or trough 22, and the cover has a downwardly-turned peripheral flange 23, that extends down into the said trough, as seen in Fig. 1. The bowl has a similar flange 24, that also extends into the trough, as seen in said figure. Leading from said trough, at a point above the lower ends of said flanges, is a pipe 25, that delivers into the tank 11.

The fume-pipe 7 is provided with a valve 26 for opening and closing the same, and the pipe 10, leading from the tank to the pump, with a similar valve 27.

The structure 12 is adapted to be adjusted vertically on the water-pipe (in order to vary the proximity of the former to the side of the bowl, and consequently the width of the passage-ways 15 and 16) by means of one or more set-screws 28, which when loosened permit the structure to be moved up or down upon the pipe, as may be required, and then secured in place.

The fume-pipe and the water-pipe may also be made vertically adjustable, if desired, by means within the knowledge of a mechanic. The end of the fume-pipe should always be at such distance from the bottom of the bowl that it will be above any water in the bottom part of the bowl when the apparatus is in operation.

On the inner side of the bowl is a series of annular projections or baffles 29, which, however, may sometimes be dispensed with.

Having now described the construction of the invention, I proceed to explain its mode of operation, as follows: The tank 11 having been charged with water or other suitable liquid, the pump is put in operation and the shaft 4, and consequently the bowl, driven at a suitable predetermined speed. The water is delivered into the bowl by way of the pipe 8, and through the centrifugal force resulting from the rapid rotation of the bowl it (the water) leaves the central portion of the bottom part of the bowl for the side thereof and tends to ascend the latter. In doing this the current or body of water impinging against the peripheral part of the plate 13 and the lower part of the skirt 14 of the structure 12 is retarded, and thereby agitated or, so to say, broken up. In rising up the side of the bowl the water is further agitated by coming into contact with the annular baffle-flanges 29. A portion of the water flows through the passage-way 18 between the cover and the top of the bowl into the trough 22. Other portions unable to enter said passage-way are deflected inwardly against the top of the plate 13 and flow down through the perforations 17 thereof, whereby the water is further broken up. The movement of the incoming water (replacing that escaping from the bowl) away from the central or bottom part toward the sides of the bowl obviously tends to create a vacuum, whereby the fumes are drawn by the suction through the fume-pipe, and these fumes being brought into intimate contact with the agitated body of water within the bowl are thereby condensed and absorbed by the water, which is finally carried off to the tank 11 by the pipe 25 and returned to the bowl by the pump 9, and so on in continuous circulation. When the water has absorbed a sufficient quantity of the fumes, it is removed from the tank and the latter is then recharged with water. The metal values contained in the water are removed from the tank and recovered by the usual well-known means, or these values or a part thereof may, if desired, be removed from the water on its way from the bowl to the tank by electrolysis or other suitable means. I sometimes allow water to flow into the tank continuously while the apparatus is in operation through a pipe 30, having a regulating-valve 31, from a source of water-supply and a quantity equal to that flowing in from said pipe to escape from the tank through an outlet-pipe 32, having a regulating-valve 33, Fig. 1. Means for cooling the water before allowing it to pass into the bowl would usually be employed; but as such means are well known I have not considered it necessary to show the same. By having provision for adjusting the cover as described and having the valve in the feed-pipe 10 the width of the opening 18 between the cover and the top of the bowl may be suitably increased or diminished and also the stream of water delivered into the bowl likewise increased or diminished. Thus a proper balance, so to say, of the influx and efflux of water into and from the bowl may be conveniently maintained. It is manifestly essential that no air be admitted to the bowl or at most not to an extent to prevent sufficient suction for drawing over the fumes through the fume-pipe 7. The object of the flanges 23 and 24 of the cover and bowl, respectively, extending into the trough 22 and the pipe 25, leading from the latter above the ends of said flanges, as previously described, is to obviate any possibility of influx of air through the passage-way 18. Obviously the level of the water in said trough will always be above the ends of said flanges. Thus a water seal is formed, insuring against admission of air through said passage-way. In order to prevent entrance of air between the cover and the water-pipe, I fit the former as closely as practicable on the pipe, and, if necessary, I use a suitable packing between the latter and the cover. If, however, the centrifugal force given the water be sufficient to cause it to escape with considerable speed through the opening 18, air will be prevented from entering the bowl through said opening.

In such case the flanges of the bowl and cover may be dispensed with, and the periphery of the cover would be turned downwardly a sufficient distance to deflect the escaping water into the trough 22. As the sole object of the structure 12 is to agitate or break up the mass of water within the bowl, so as to bring the particles of water and fumes into intimate contact, other suitable means for causing the desired agitation and breaking up may be employed in lieu of that hereinbefore described. I may remark, however, that although obviously the greater the breaking up of the water the greater will be the condensation or absorption of the fumes. Special devices for effecting such breaking up may sometimes be dispensed with, as the descent of the water into the bowl and movement thereof from the center to the circumference of the bowl serves to more or less agitate and break up the water.

I do not wish to be understood as being limited to the use of a bowl of the form shown in the drawings, nor to a rotatable bowl, as it may be fixed and the centrifugal force be imparted to the water by suitable wings or paddles on a rotatable shaft extending into the bowl. Nor do I limit myself to the precise form and construction of the other parts of the apparatus, as they may be varied by those skilled in the art to which the invention pertains without departing from the essential principle of the invention, the form and construction herein described and shown being that which at present I believe to be the best embodiment of my invention.

I claim as new and desire to secure by Letters Patent—

1. The combination of the bowl, the cover, the fume-pipe leading into the central part of the bowl, the water-supply pipe also leading into the central part of the bowl, the trough, and means for imparting centrifugal force to the water within said bowl, there being a passage-way communicating between the interior of the latter and said trough, substantially as and for the purpose set forth.

2. The combination of the rotatable bowl, the cover, the fume-pipe leading into the central part of the bowl, the water-pipe also leading into the central part of the bowl; together with the trough; there being a passage-way communicating between the interior of said bowl and said trough, substantially as and for the purpose set forth.

3. The combination of the rotatable bowl, the cover, the fume-pipe leading into the central part of the bowl, the water-supply pipe leading into the latter, the trough, there being a passage-way leading from the upper part of said bowl into said trough; together with means for effecting agitation and breaking up of the liquid within said bowl, substantially as and for the purpose set forth.

4. The combination of the rotatable bowl, the cover, the fume-pipe leading into the central part of said bowl, the water-supply pipe leading into the central part of the bowl; together with the trough; there being an opening leading from said bowl into said trough, and means for varying the size of said opening, substantially as and for the purpose set forth.

5. The combination of the rotatable bowl, the stationary cover supported out of contact therewith, whereby an opening is left between the cover and the top of the bowl, the trough surrounding said bowl with which said opening communicates, the fume-pipe leading into the central part at the lower portion of the bowl, the water-supply pipe leading into the central part of the bowl, and means for agitating and breaking up the liquid within the bowl, substantially as and for the purpose set forth.

6. The combination of the rotatable bowl having the downwardly-projecting flange, the cover supported above and out of contact therewith, and having the downwardly-projecting flange, the trough into which said two flanges extend, the pipe leading from said trough above the free end of said flanges, the fume-pipe leading into the central part of the lower portion of the bowl, the water-supply pipe delivering into the central part of the bowl, and means for agitating and breaking up the water within the bowl, substantially as and for the purpose set forth.

7. The combination of the rotatable bowl, the stationary cover supported above and out of contact therewith, means for effecting vertical adjustments of the latter whereby the width of the opening between the same and the top of the bowl may be varied, the trough surrounding the bowl with which said opening communicates, and the fume-pipe and water-supply pipe leading respectively into the central part of the bowl adjacent to the bottom thereof, substantially as and for the purpose set forth.

8. The combination of the bowl, the cover, the fume-pipe leading into the central part of the bowl, the water-supply pipe leading into the bowl, the trough, there being a passage-way leading from the interior of the bowl into said trough, the tank, the pipe leading from the trough into said tank, the pump communicating with the water-supply pipe and with said tank, and means for imparting centrifugal force to the water within the bowl, substantially as and for the purpose set forth.

9. The combination of the rotatable bowl, the cover, the fume-pipe leading into the central part of the bowl, the water-supply pipe leading into the latter, the trough surrounding said bowl, there being an opening between the latter and said cover communicating with said trough, the fixed structure within said bowl composed of the perforated plate, and the skirt depending therefrom, and of less diameter than said plate, substantially as and for the purpose set forth.

10. The combination of the rotatable bowl, the cover, the water-supply pipe passing through the latter and leading into and concentric with the bowl, the fume-pipe concentric with the bowl, and passing through said water-supply pipe; the trough surrounding said bowl; there being an opening between the latter and said cover communicating with said trough, substantially as and for the purpose set forth.

In testimony whereof I have hereunto affixed my signature this 29th day of December, A. D. 1902.

ROBERT McKNIGHT.

Witnesses:
JOHN M. CAMPBELL,
WALTER C. PUSEY.